(12) United States Patent
Huang

(10) Patent No.: US 12,328,441 B2
(45) Date of Patent: Jun. 10, 2025

(54) IMAGE PROCESSING METHOD BASED ON SEGMENTATION MAP AND RELATED VIDEO PROCESSOR

(71) Applicant: NOVATEK Microelectronics Corp., Hsin-Chu (TW)

(72) Inventor: Yi-Hung Huang, Hsinchu County (TW)

(73) Assignee: NOVATEK Microelectronics Corp., Hsin-Chu (TW)

(*) Notice: Subject to any disclaimer, the term of this patent is extended or adjusted under 35 U.S.C. 154(b) by 178 days.

(21) Appl. No.: 18/230,184

(22) Filed: Aug. 4, 2023

(65) Prior Publication Data

US 2025/0047890 A1    Feb. 6, 2025

(51) Int. Cl.
  *H04N 19/513*    (2014.01)
  *G06T 7/194*    (2017.01)
  *G06V 20/70*    (2022.01)

(52) U.S. Cl.
  CPC ........... *H04N 19/513* (2014.11); *G06T 7/194* (2017.01); *G06V 20/70* (2022.01)

(58) Field of Classification Search
  CPC ...... G06T 7/194; G06V 20/70; H04N 19/513; H04N 19/553
  See application file for complete search history.

(56) References Cited

U.S. PATENT DOCUMENTS

| | | |
|---|---|---|
| 5,541,660 A | 7/1996 | Kim |
| 6,618,439 B1 | 9/2003 | Kuo |
| 2005/0129124 A1 | 6/2005 | Ha |
| 2007/0297513 A1* | 12/2007 | Biswas ............... H04N 7/014 348/E7.013 |
| 2009/0046208 A1 | 2/2009 | Kwon |
| 2009/0213937 A1* | 8/2009 | Kawase ............ H04N 19/182 375/E7.123 |
| 2012/0154675 A1 | 6/2012 | Nasu |
| 2013/0101039 A1 | 4/2013 | Florencio |
| 2013/0170551 A1* | 7/2013 | Liu ...................... H04N 19/61 348/E7.003 |

* cited by examiner

*Primary Examiner* — Jessica M Prince
(74) *Attorney, Agent, or Firm* — Winston Hsu

(57) ABSTRACT

An image processing method for a video processor for generating an interpolated frame includes steps of: receiving a segmentation map comprising a plurality of segmentation flags; generating an original motion vector (MV) for a first block of the interpolated frame; determining whether to label the first block as a segmentation boundary according to the plurality of segmentation flags in an area corresponding to the first block; generating a correction MV for the first block when the first block is labeled as the segmentation boundary; determining whether the first block is in a cover area or an uncover area according to the correction MV; and selecting a final MV for a specific pixel of the first block from the original MV and the correction MV according to the segmentation map and according to whether the first block is determined to be in the cover area or the uncover area.

25 Claims, 7 Drawing Sheets

IMAGE PROCESSING METHOD BASED ON SEGMENTATION MAP AND RELATED VIDEO PROCESSOR

BACKGROUND OF THE INVENTION

1. Field of the Invention

The present invention relates to an image processing method for a video processor, and more particularly, to an image processing method based on a segmentation map and a related video processor.

2. Description of the Prior Art

Motion estimation and motion compensation (MEMC) is a technology used for frame interpolation, which allows a series of image frames to be displayed with a higher frame rate. For example, if a 30 Hz source video such as a film is required to be displayed in 60 Hz, an interpolated frame should be added between every two adjacent input frames of the source video, so as to double the frame rate. The images of the interpolated frame may be predicted by using motion vectors (MVs) between a current input frame and a previous input frame, so as to display the output video smoothly.

Since the interpolated frame is constructed by using originally inexistent images generated based on the MVs, the accuracy of the MVs is essential during the MEMC operations. In the interpolated frame, a halo may be generated if several interpolated images are generated by taking inaccurate MVs, and the halo easily appears at the boundary of a moving object. Thus, people in the industry are making their efforts to improve the accuracy of MV prediction, especially for those blocks at the boundary of foreground objects.

SUMMARY OF THE INVENTION

It is therefore an objective of the present invention to provide a novel image processing method for a video processor, in order to improve the accuracy of motion vector (MV) prediction.

An embodiment of the present invention discloses an image processing method for a video processor, for generating an interpolated frame having a plurality of blocks according to a previous frame and a current frame. The method comprises steps of: receiving a segmentation map comprising a plurality of segmentation flags; generating an original MV for a first block among the plurality of blocks; determining whether to label the first block as a segmentation boundary according to the plurality of segmentation flags in an area corresponding to the first block; generating a correction MV for the first block when the first block is labeled as the segmentation boundary; determining whether the first block is in a cover area or an uncover area according to the correction MV; and selecting a final MV for a specific pixel of the first block from the original MV and the correction MV according to the segmentation map and according to whether the first block is determined to be in the cover area or the uncover area.

Another embodiment of the present invention discloses a video processor to generate an interpolated frame having a plurality of blocks according to a previous frame and a current frame by receiving a segmentation map comprising a plurality of segmentation flags. The video processor comprises a motion estimation (ME) circuit, a vector process (VP) circuit and a motion compensation (MC) circuit. The ME circuit generates an original MV for a first block among the plurality of blocks, and determines whether to label the first block as a segmentation boundary according to the plurality of segmentation flags in an area corresponding to the first block. The VP circuit, coupled to the ME circuit, generates a correction MV for the first block when the ME circuit labels the first block as the segmentation boundary, and determines whether the first block is in a cover area or an uncover area according to the correction MV. The MC circuit, coupled to the VP circuit, selects a final MV for a specific pixel of the first block from the original MV and the correction MV according to the segmentation map and according to whether the first block is determined to be in the cover area or the uncover area by the VP circuit.

Another embodiment of the present invention discloses a video processor to generate an interpolated frame having a plurality of blocks according to a previous frame and a current frame by receiving a segmentation map comprising a plurality of segmentation flags. The video processor comprises an ME circuit, a VP circuit and an MC circuit. The ME circuit generates an original MV for a first block among the plurality of blocks, and determines whether to label the first block as a segmentation boundary according to the plurality of segmentation flags in an area corresponding to the first block. The VP circuit, coupled to the ME circuit, generates a correction MV for the first block when the ME circuit labels the first block as the segmentation boundary. The MC circuit, coupled to the VP circuit, selects a final MV for a specific pixel of the first block from the original MV and the correction MV according to the segmentation map.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
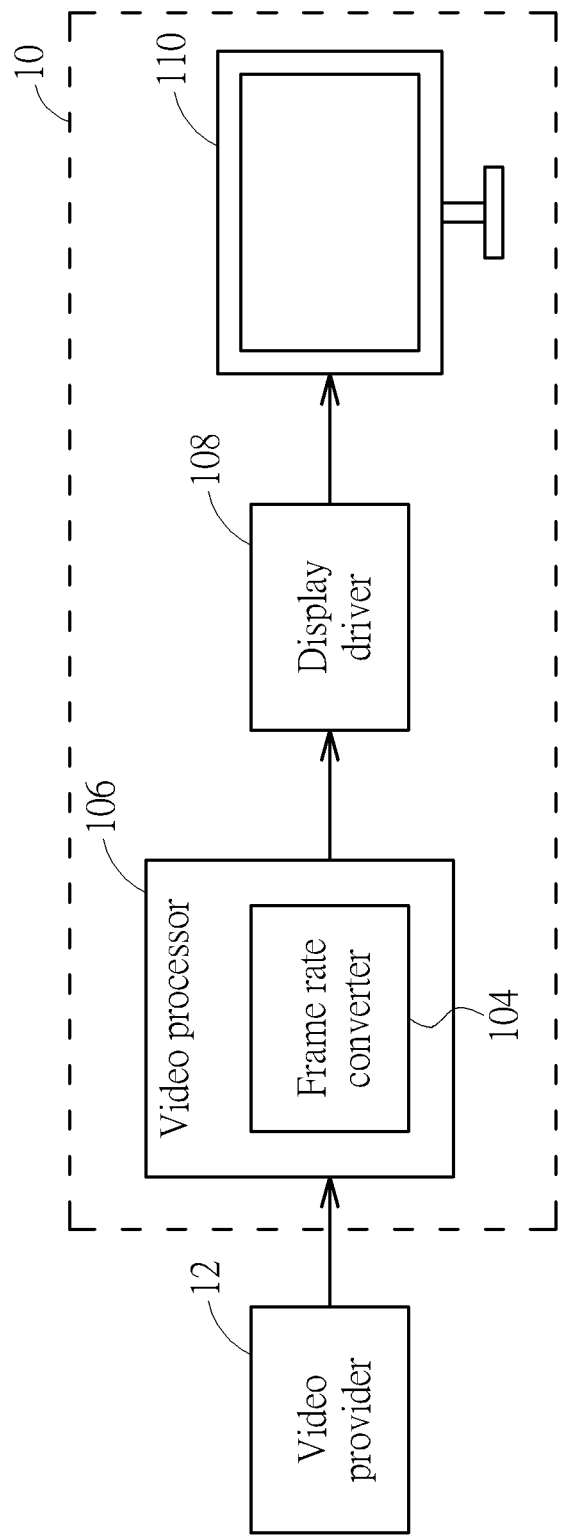
FIG. 1 is a schematic diagram of a display system according to an embodiment of the present invention.

FIG. 1 is a schematic diagram of a display system 10 according to an embodiment of the present invention. As shown in FIG. 1, the display system 10 such as a television (TV) may receive and display a source video having a series of image frames provided by a video provider 12 such as a DVD player or a video streaming service provider communicated with the display system 10 via a wired network or a wireless network. The display system 10 includes a video processor 106, a display driver 108 and a display panel 110. In general, the frame rate of the source video may not be the same as the frame rate to be displayed on the display panel 110. The video processor 106 may include a TV controller integrated circuit (IC) and/or a frame rate conversion (FRC) IC for converting the source video which usually has a lower frame rate to generate a series of output frames of a higher frame rate to be displayed by the display panel 110. Or, the video processor 106 may be a TV controller IC embedded with a function of FRC. That is, the frame rate converter 104 depicted in FIG. 1 could be regarded as a stand-alone FRC IC or an internal FRC circuit inside the TV controller IC. For example, when receiving a 24-Hz input video having two input frames A and B, the frame rate converter 104 may convert the 2 input frames A and B into 5 image frames A, A, A, B, B in 60 Hz, and perform motion estimation and motion compensation (MEMC) to generate appropriate interpolated or extrapolated frames based on these input frames.

In another embodiment, the video processor 106 may include a graphics processing unit (GPU) and a stand-alone FRC IC, or the video processor 106 may be a GPU with an internal FRC circuit inside the GPU.

The display driver 108 may convert the image data into data voltage signals and drive the display panel 110 to display the image frames through the data voltage signals. The display driver 108 may include a timing controller, a source driver, a gate driver, and/or any other devices capable of driving the display panel 110. The display panel 110 may be of any type such as a liquid crystal display (LCD) panel, light-emitting diode (LED) display, and plasma display panel (PDP), but not limited thereto.

The algorithms for MEMC may be developed based on a segmentation map, which could indicate each pixel of an image frame has a foreground image or a background image. For example, the segmentation map may include a plurality of segmentation flags, each having a 1-bit data and corresponding to one pixel. In other words, the segmentation map includes pixel-level data, where each segmentation flag indicates the image information of a corresponding pixel, and the segmentation flags corresponding to a frame of pixels may form a segmentation map. The segmentation map may accurately and finely define the foreground area and/or background area of an image frame in the pixel level. In an exemplary embodiment, in a segmentation map, a segmentation flag corresponding to a pixel in the background area will be 0, and a segmentation flag corresponding to a pixel in the foreground area will be 1.

The present invention provides a novel image processing method for performing MEMC based on the information provided from the segmentation map. The provided image processing method may be implemented in a frame rate converter and/or a video processor, such as the frame rate converter 104 and/or the video processor 106 shown in FIG. 1. The image processing method may provide a dehalo function (i.e., remove the halo in the interpolated images) based on the information of the segmentation map. Since the segmentation map has pixel-level information, the dehalo may be performed more efficiently and the accuracy of motion vector (MV) prediction may be improved by using the segmentation map in the MEMC operations.

Figure 2:
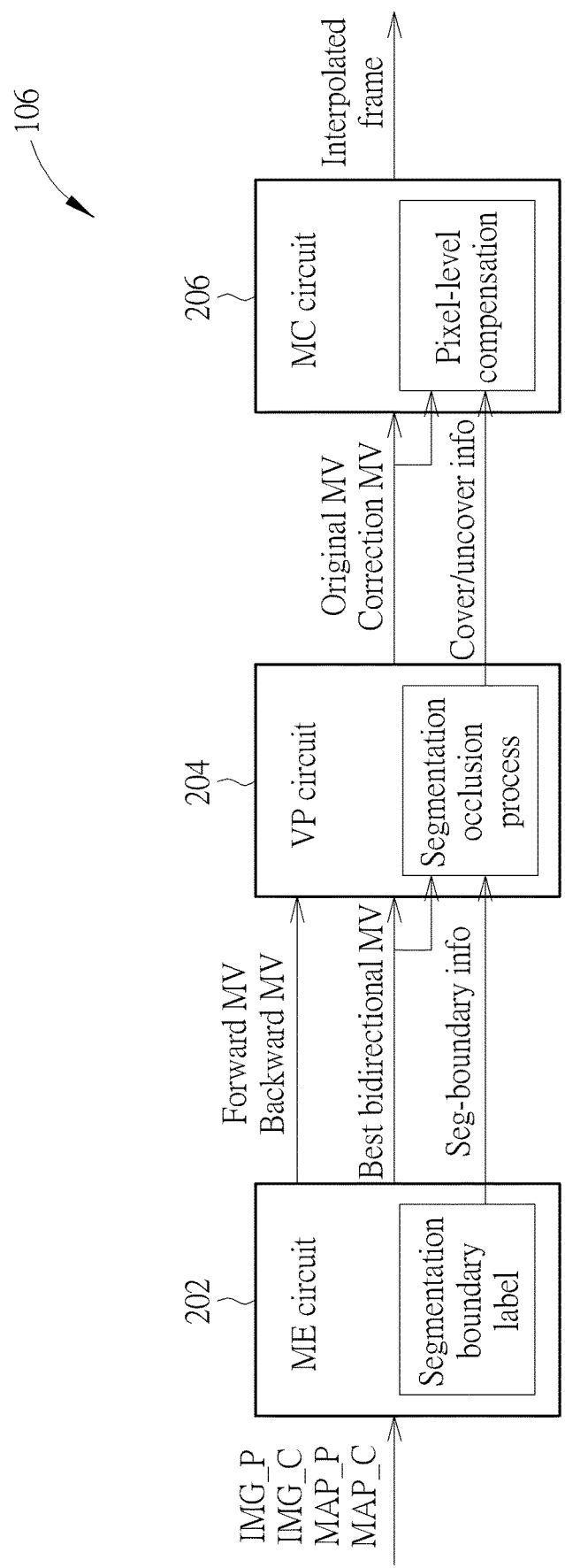
FIG. 2 illustrates a detailed implementation of the video processor.

FIG. 2 illustrates a detailed implementation of the video processor 106. The video processor 106 includes a motion estimation (ME) circuit 202, a vector process (VP) circuit 204 and a motion compensation (MC) circuit 206. The video processor 106 may generate at least one interpolated frame according to a previous frame and a current frame, where each block of the interpolated frame may be predicted by choosing a best MV. Each block may include multiple pixels, and these pixels may be divided and allocated to the blocks in any appropriate manner. In general, the ME circuit 202 may generate one or more best MVs (including a bidirectional MV, a forward MV and/or a backward MV) for each block. As for each block, the ME circuit 202 may calculate the sum of absolute difference (SAD) of images in areas of the previous frame and the current frame projected by each MV, to find the MV(s) having the minimum SAD, so as to generate the best MV(s) for this block. Alternatively or additionally, a cost function including the SAD may be applied to determine the similarity of images projected by each MV, to select the best MV(s) from multiple candidate MVs. The VP circuit 204, coupled to the ME circuit 202, may process the received bidirectional MV, forward MV and backward MV, to generate one or more final MVs and output the final MV(s) to the MC circuit 206. The MC circuit 206 then generates the images in each block based on the corresponding final MV(s), so as to generate the interpolated frame.

Figure 3:
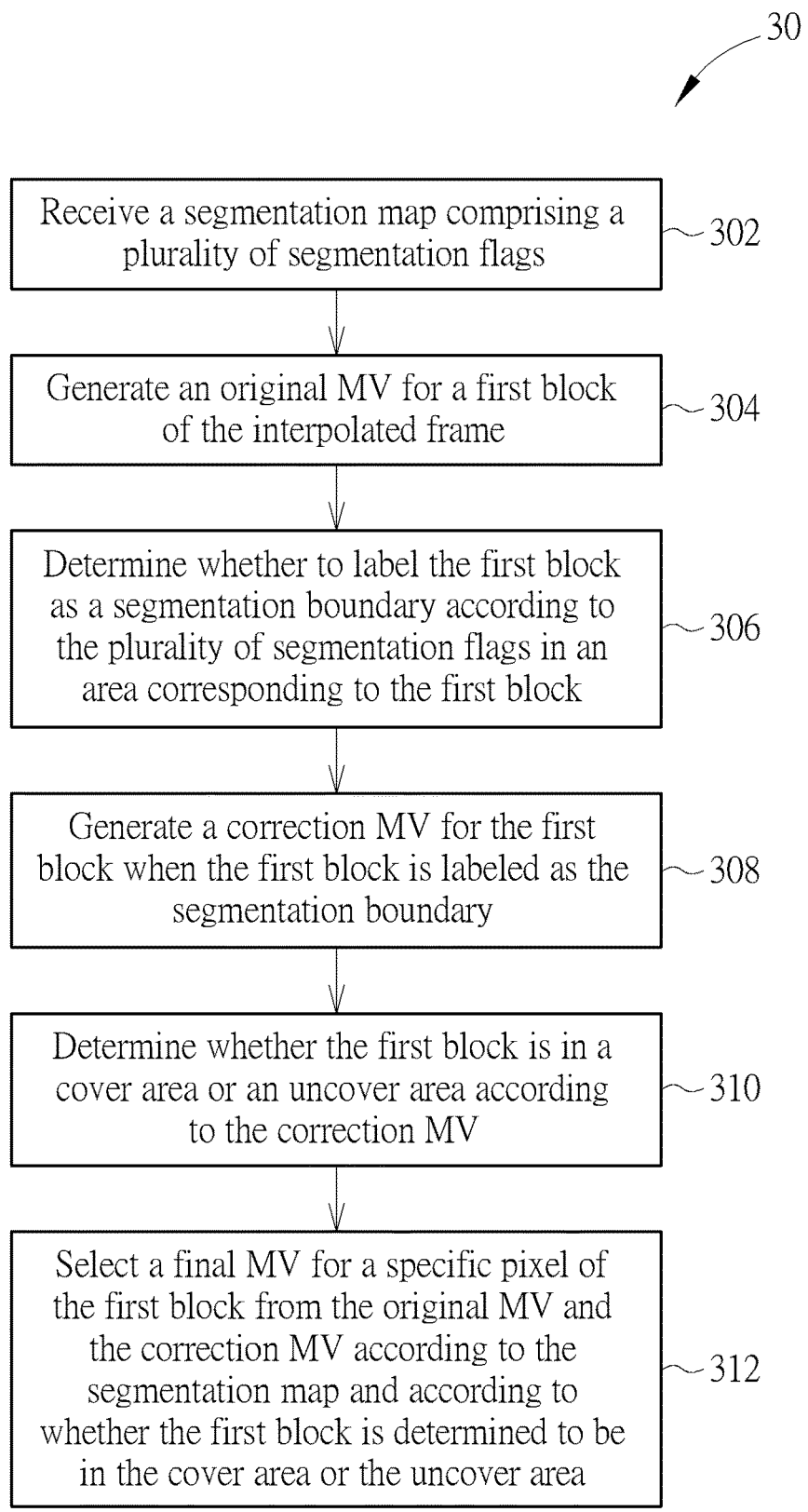
FIG. 3 is a flowchart of an image processing process according to an embodiment of the present invention.

FIG. 3 is a flowchart of an image processing process 30 according to an embodiment of the present invention. The image processing process 30 may be implemented in a video processor, such as the video processor 106 shown in FIG. 1 and FIG. 2, for generating an interpolated frame based on a previous frame and a current frame. As shown in FIG. 3, the image processing process 30 includes the following steps:

Step 302: Receive a segmentation map including a plurality of segmentation flags.

Step 304: Generate an original MV for a first block of the interpolated frame.

Step 306: Determine whether to label the first block as a segmentation boundary according to the plurality of segmentation flags in an area corresponding to the first block.

Step 308: Generate a correction MV for the first block when the first block is labeled as the segmentation boundary.

Step 310: Determine whether the first block is in a cover area or an uncover area according to the correction MV.

Step 312: Select a final MV for a specific pixel of the first block from the original MV and the correction MV according to the segmentation map and according to whether the first block is determined to be in the cover area or the uncover area.

According to the image processing process 30, the ME circuit 202, the VP circuit 204 and the MC circuit 206 of the video processor 106 receive the segmentation map and perform respective operations based on the segmentation map. Note that the steps of the image processing process 30 may be applied to all blocks or partial blocks of the interpolated frame in the same manner, where the first block is taken as an example for descriptions.

Referring to FIG. 3 along with FIG. 2, since the video processor 106 performs image interpolation by using a previous frame IMG_P and a current frame IMG_C, it may receive a segmentation map MAP_P of the previous frame IMG_P and a segmentation map MAP_C of the current frame IMG_C.

First, the ME circuit 202 may perform "segmentation boundary label" by using the segmentation maps MAP_P and MAP_C. As mentioned above, the ME circuit 202 may generate several best MVs, including a forward MV, a backward MV and/or a bidirectional MV, for each block.

For example, a best bidirectional MV for the first block may be selected from multiple candidate MVs. The ME circuit 202 may project each of the candidate MVs to the previous frame IMG_P and/or the current frame IMG_C, obtain the images in a first area of the previous frame IMG_P projected by the candidate MV and the images in a second area of the current frame IMG_C projected by the candidate MV, and calculate the SAD between the images in the first area and the images in the second area. The ME circuit 202 may obtain the SAD corresponding to each candidate MV, and take the bidirectional MV having the minimum SAD as the best bidirectional MV. The ME circuit 202 then outputs the best bidirectional MV to the VP circuit 204.

As mentioned above, the ME circuit 202 may also obtain the segmentation map MAP_P of the previous frame IMG_P and the segmentation map MAP_C of the current frame IMG_C, and each segmentation map MAP_P and MAP_C has a plurality of segmentation flags for indicating pixel states. As for the best bidirectional MV, while taking the image content of the first area and the second area for calculating the SAD, the ME circuit 202 may also obtain the segmentation flags in the first area and the segmentation flags in the second area, and use the segmentation flags in these areas to perform segmentation boundary label; that is, to determine whether to label the first block as segmentation boundary.

In an embodiment, the ME circuit 202 may obtain the segmentation flags in the areas projected by each candidate MV when calculating the SAD, and take the segmentation flags corresponding to the best bidirectional MV to perform the segmentation boundary label. Alternatively, the ME circuit 202 may determine the best bidirectional MV and then apply the projection results of the best bidirectional MV to determine the areas for obtaining the segmentation flags used to perform the segmentation boundary label. The areas for obtaining the segmentation flags may be the same as or different from the abovementioned first area and second area used for calculating the SAD and determining the best bidirectional MV.

Figure 4:
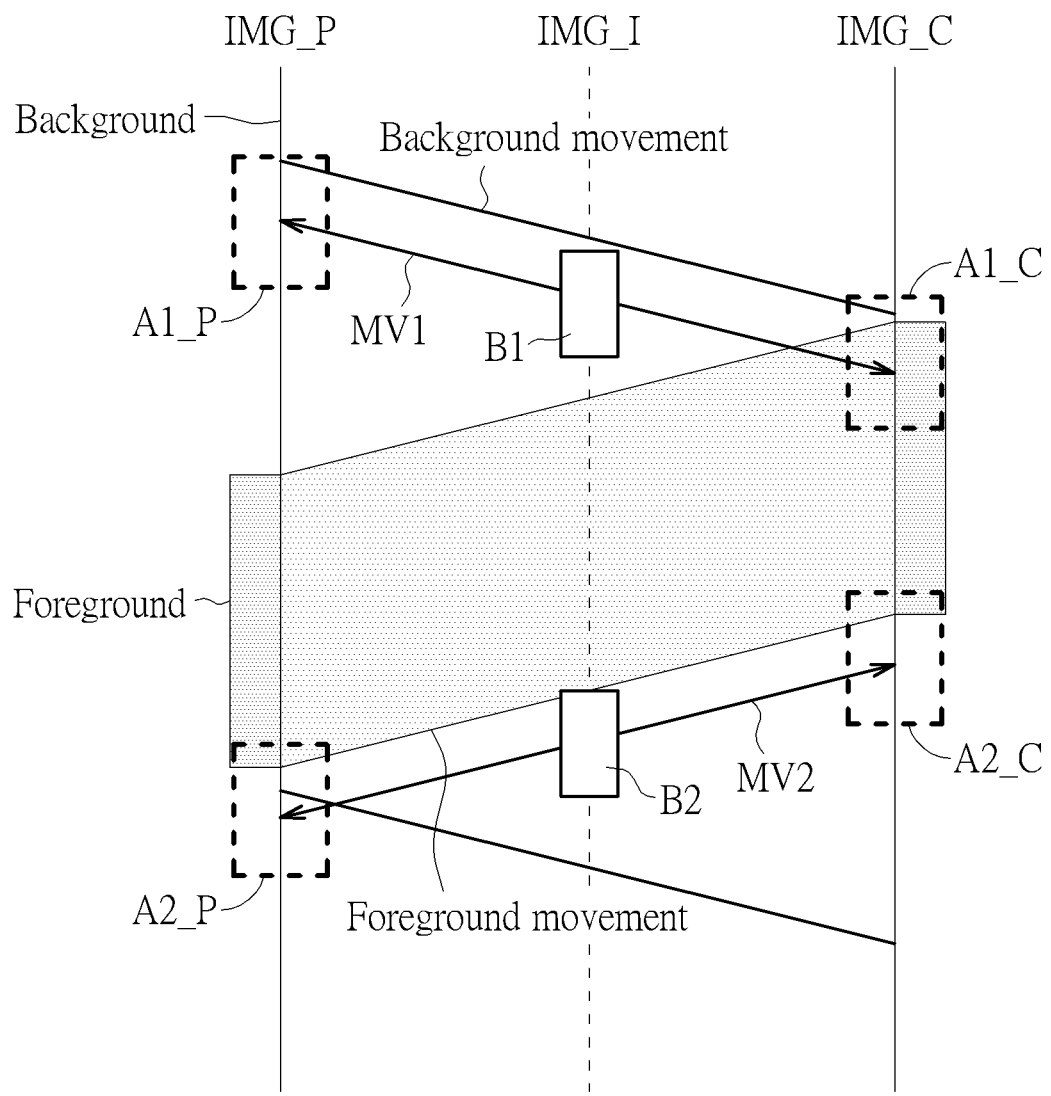
FIG. 4 illustrates the segmentation boundary label operation for blocks in an interpolated frame.

FIG. 4 illustrates the segmentation boundary label operation for blocks B1 and B2 in an interpolated frame IMG_I, which is generated based on the previous frame IMG_P and the current frame IMG_C. As shown in FIG. 4, these image frames may include a background image moving downwards which is covered by a foreground object moving upwards, and the interpolated frame IMG_I is generated by predicting the motions of moving objects in the MEMC operations. In this embodiment, the ME circuit 202 may generate best bidirectional MVs MV1 and MV2 for the blocks B1 and B2, respectively.

As shown in FIG. 4, the best bidirectional MV MV1 of the block B1 is projected to the previous frame IMG_P and the current frame IMG_C, to find an area A1_P in the previous frame IMG_P and an area A1_C in the current frame IMG_C. Each of the areas A1_P and A1_C may include M pixels. Among the total 2M pixels in the areas A1_P and A1_C, the ME circuit 202 may refer to the segmentation maps MAP_P and MAP_C for the previous and current frames IMG_P and IMG_C, and determine how many segmentation flags in the areas A1_P and A1_C indicate foreground, so as to calculate the number of pixels in the areas A1_P and A1_C labeled as the foreground image.

Similarly, the best bidirectional MV MV2 of the block B2 is projected to the previous frame IMG_P to find an area A2_P and projected to the current frame IMG_C to find an area A2_C, where each of the areas A2_P and A2_C may also include M pixels. By referring to the segmentation maps MAP_P and MAP_C, the ME circuit 202 may determine how many segmentation flags in the areas A2_P and A2_C indicate foreground, so as to calculate the number of pixels in the areas A2_P and A2_C labeled as the foreground image.

If a block of the interpolated frame is entirely in the background area, the areas in the previous frame and the current frame projected by its best bidirectional MV may usually be in the background area, and thus the number of segmentation flags indicating foreground may be equal to or close to 0. Conversely, if a block of the interpolated frame is entirely in the foreground area, the areas in the previous frame and the current frame projected by its best bidirectional MV may usually be in the foreground area, and thus the number of segmentation flags indicating foreground may be equal to or close to 2M (i.e., total pixel count in the areas). In addition, if a block of the interpolated frame is at or near the boundary of a foreground image, the areas in the previous frame and the current frame projected by its best bidirectional MV may usually include both the foreground area and background area, and thus the number of segmentation flags indicating foreground may have a medium value between 0 and 2M.

In an embodiment, the ME circuit 202 may define a low threshold TH1 and a high threshold TH2 for segmentation boundary label. In the areas projected by the best bidirectional MV of a block, the ME circuit 202 may calculate the number of pixels labeled as the foreground image based on the segmentation maps. If the number of pixels labeled as the foreground image is between the low threshold TH1 and the high threshold TH2, this block may be determined to be labeled as the segmentation boundary, which may indicate the boundary of a foreground object. Also, if the number of pixels labeled as the foreground image is less than the low threshold TH1, this block may be determined to be a background block; and if the number of pixels labeled as the foreground image is greater than the high threshold TH2, this block may be determined to be a foreground block. The low threshold TH1 and the high threshold TH2 may be set to any appropriate values between 0 and the total pixel count in the associated areas (e.g., 2M in the above embodiment), where the high threshold TH2 is greater than the low threshold TH1.

Referring to FIG. 4, as for the block B1, the corresponding area A1_P in the previous frame IMG_P is in the background area and the corresponding area A1_C in the current frame IMG_C is in the foreground area. Therefore, the total number of pixels in the areas A1_P and A1_C labeled as foreground by the segmentation flags may be approximately equal to M, which may be a medium value between 0 and 2M; hence, the block B1 may be determined to be at the boundary of a foreground object and labeled as the segmentation boundary. As for the block B2, the corresponding area A2_P in the previous frame IMG_P may include both background and foreground images, and the corresponding area A2_C in the current frame IMG_C may also include both background and foreground images. Therefore, the total number of pixels in the areas A2_P and A2_C labeled as foreground by the segmentation flags may be a medium value between 0 and 2M; hence, the block B2 may be determined to be at the boundary of a foreground object and labeled as the segmentation boundary. In the conventional interpolated images, the boundaries of moving foreground objects are the areas where halo may easily appear. Therefore, the ME circuit 202 may label the blocks in these areas to facilitate the subsequent dehalo operations.

Subsequently, the ME circuit 202 may send the information of the blocks labeled as the segmentation boundary to the VP circuit 204, as shown in FIG. 2. The VP circuit 204 may perform "segmentation occlusion process" based on the information provided from the ME circuit 202. The "segmentation occlusion process" operation includes two main steps. First, the VP circuit 204 may perform MV correction on the occlusion areas in the segmentation boundary which may not be easily processed by the conventional MEMC algorithms. Second, as for the blocks in the occlusion areas, the VP circuit 204 may determine whether each block is in a cover area or an uncover area.

Figure 5:
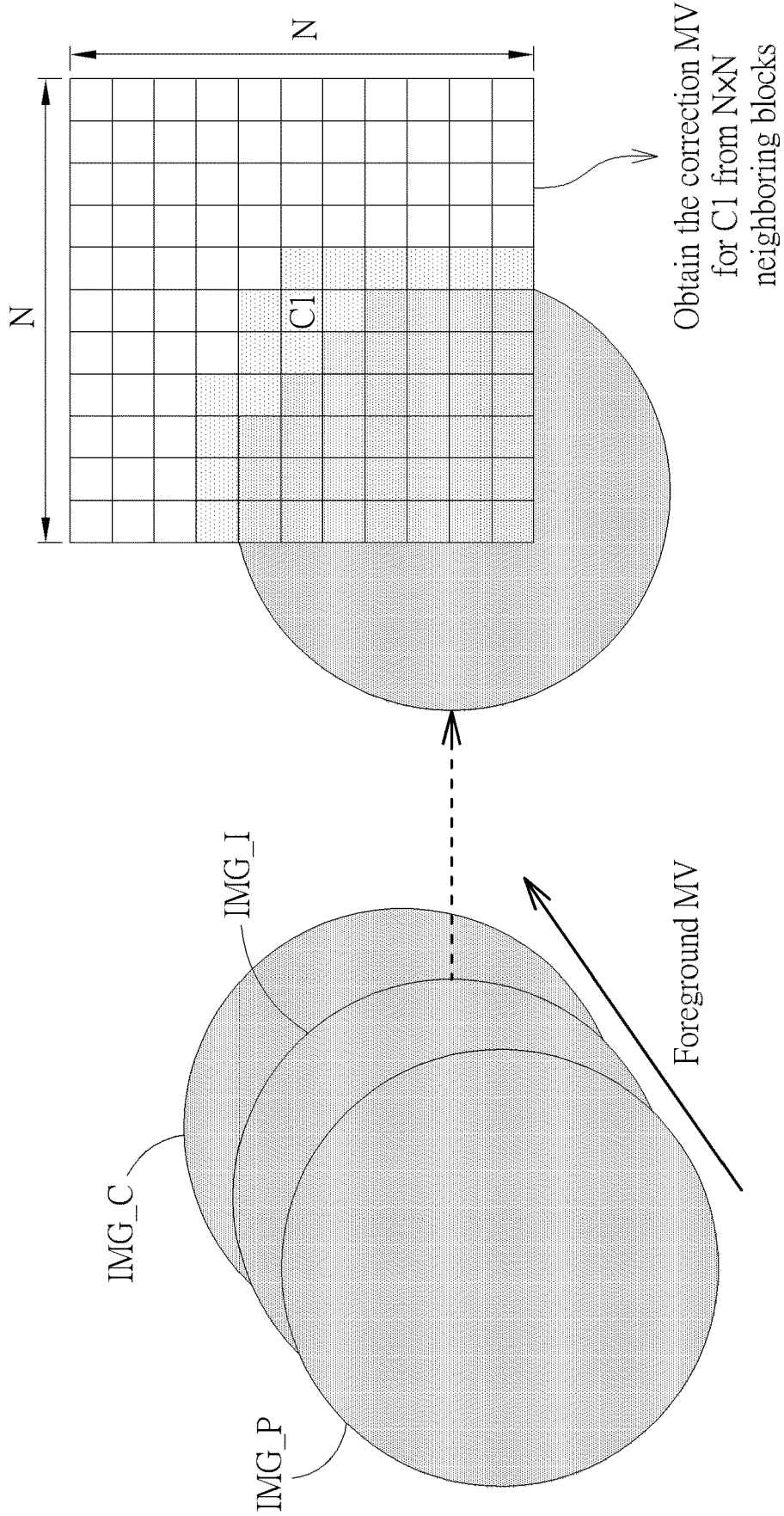
FIG. 5 illustrates the operations of obtaining a correction MV from a plurality of neighboring blocks.

As for the first block labeled as the segmentation boundary, if an appropriate MV could be taken from multiple neighboring blocks for correction of the first block, the first block may be considered as in an occlusion area. Referring to FIG. 5, a foreground object of the interpolated frame IMG_I is generated through a foreground MV based on the movement of this foreground object from the previous frame IMG_P to the current frame IMG_C. In the interpolated frame IMG_I, each grid shown in FIG. 5 may be considered as a block, where high-density dotted blocks refer to foreground area, empty blocks refer to background area, and low-density dotted blocks are at the boundary of the foreground object and thereby labeled as the segmentation boundary.

As mentioned above, the ME circuit 202 may obtain the best bidirectional MV for each block of the interpolated frame IMG_I, and send the information of the best bidirectional MV for each block to the VP circuit 204. Therefore, as for the first block labeled as the segmentation boundary and determined to be in the occlusion area, the VP circuit 204 may generate a correction MV for the first block.

As shown in FIG. 5, as for a block C1 labeled as the segmentation boundary, a plurality of neighboring blocks around the block C1 are taken into consideration. In this embodiment, the VP circuit 204 may mark out an area centered on the block C1 and having N×N blocks, where N may be any positive integer. Subsequently, the VP circuit 204 may obtain the best bidirectional MV for each of the N×N neighboring blocks as a candidate MV to generate a candidate pool. The VP circuit 204 may then select a correction MV for the block C1 from the candidate MVs included in the candidate pool.

The correction MV should meet several criteria. Since the dehalo operation aims at removing unwanted halos around the boundary of a moving foreground object, where the halos might be generated by taking wrong foreground MVs in the background area near the foreground object, the dehalo operation is requested to replace the wrong foreground MVs by accurate background MVs. In such a situation, the correction MV determined by the VP circuit 204 may be a background MV which is for a block belonging to the background image. For example, in FIG. 5, those blocks at the upper-right side among the N×N neighboring blocks may generate background MVs to be selected as the correction MV for the block C1.

Therefore, it is necessary to determine whether each block among the N×N neighboring blocks is a background block, in order to obtain the appropriate correction MV. In an embodiment, this operation is completed in the ME circuit 202 according to the segmentation map, where the ME circuit 202 determines each block belongs to foreground, background, or segmentation boundary by calculating the number of pixels in the projected areas labeled as foreground by the segmentation flags, and comparing the calculated number with a low threshold and a high threshold. As mentioned above, a block may be determined to be a background block if the number of pixels labeled as foreground is less than the low threshold. In such a situation, the correction MV should be selected from the candidate MVs for those neighboring blocks determined to be background blocks according to the segmentation map.

However, there may be multiple background blocks around the block C1, and thus there may be multiple candidate MVs that could be selected as the correction MV. In such a situation, a cost function may be applied to perform selection to determine the best correction MV.

In an embodiment, the cost function may be associated with the distance between the block C1 and each neighboring block. For example, the distance of the block C1 and a neighboring block may be taken as a factor for calculating the cost function. The value of the cost function for an MV may be smaller if this MV is for a neighboring background block nearer to the block C1; and the value of the cost function for an MV may be larger if this MV is for a neighboring background block farther from the block C1. In general, an MV for a neighboring block nearer to the block C1 may be more reliable, and is more probably selected as the correction MV.

Alternatively or additionally, the cost function may be associated with the SAD of the candidate MVs to be taken for selecting the correction MV. As mentioned above, the ME circuit 202 may calculate the SAD of each bidirectional MV to determine the best bidirectional MV for each block; hence, each MV may be given with an SAD value that indicates the similarity of the previous image and the current image projected by the MV, to represent the accuracy of the MV. Therefore, in addition to outputting the best bidirectional MV, the ME circuit 202 may send the SAD value of each best bidirectional MV to the VP circuit 204, allowing the VP circuit 204 to select the correction MV according to the SAD value. In such a situation, the SAD of each best bidirectional MV may be taken as a factor for calculating the cost function. For example, the value of the cost function for an MV may be smaller if this MV has a smaller SAD; and the value of the cost function for an MV may be larger if this MV has a larger SAD. In general, an MV having a smaller SAD may be more reliable, and is more probably selected as the correction MV.

In an embodiment, the cost function may be the summation of the distance parameter and the SAD parameter, and the VP circuit 204 may select a background MV having the minimum value of the cost function as the correction MV, which may have a smaller distance with the block C1 and/or a smaller SAD. In such a situation, both the distance of blocks and the SAD values of MVs are taken into consideration to determine the correction MV, so as to achieve a more comprehensive determination result.

In addition to obtaining the correction MV for each block in the occlusion area, the VP circuit 204 may also determine whether each block is in the cover area or the uncover area. The "cover" and "uncover" indicate the situations that foreground and background objects cross each other. The cover area is an area where a foreground object covers the background which is originally viewable in the previous frame, and the uncover area is an area where the background originally covered by a foreground object appears in the produced interpolated frame. The cover and uncover areas have crossing of foreground objects and background images, and thus the halos may easily appear in these areas. The motion compensation may be performed on the cover area and the uncover area in different manners.

In an embodiment, the VP circuit 204 may determine whether the block in the occlusion area is in the cover area or the uncover area according to the correction MV by using the segmentation map. For example, as shown in FIG. 5, after the correction MV for the block C1 is obtained, the VP circuit 204 may project the correction MV to the previous frame IMG_P and the current frame IMG_C to obtain the positions projected by the correction MV.

Figure 6:
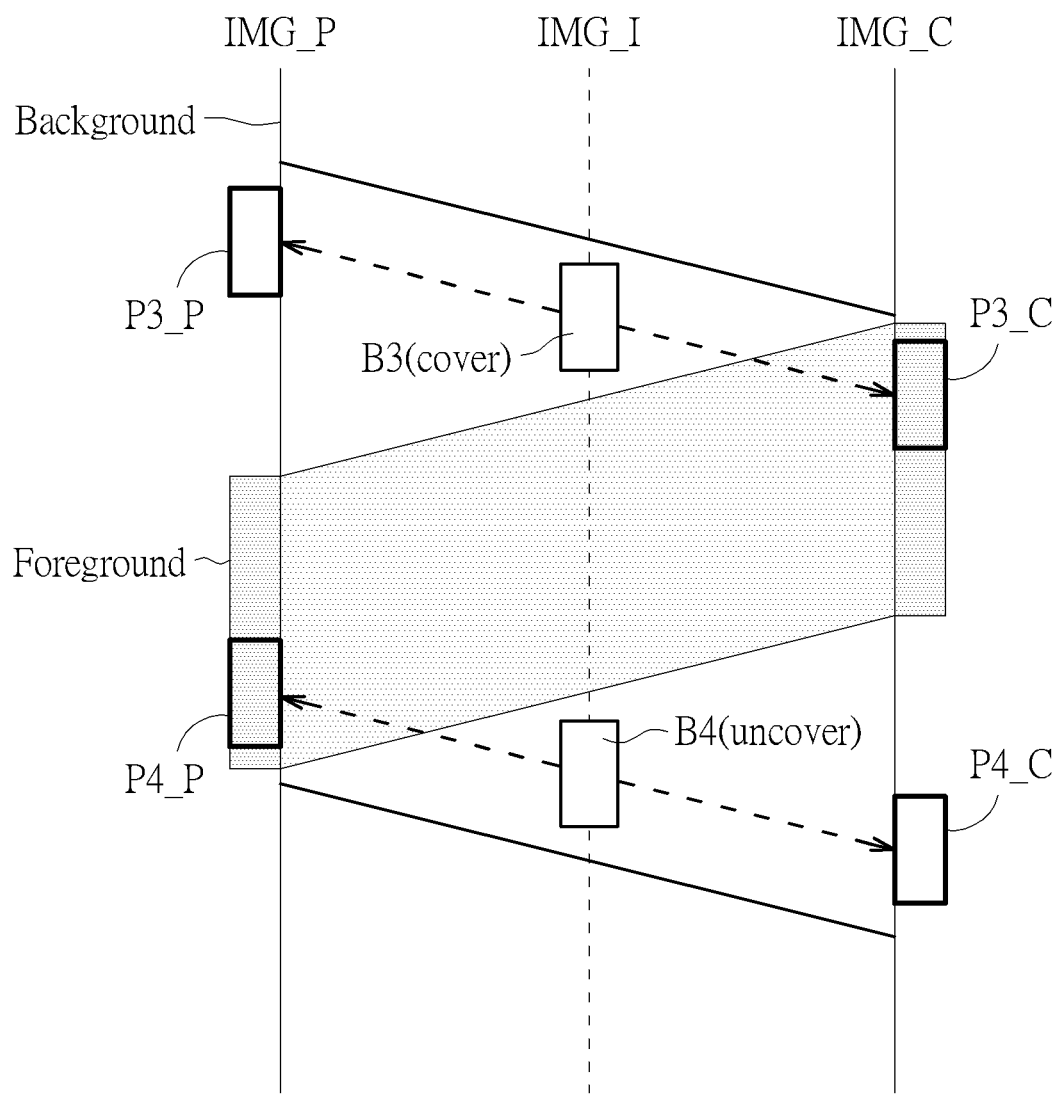
FIG. 6 illustrates an exemplary implementation of determining the cover area and the uncover area.

FIG. 6 illustrates an exemplary implementation of determining the cover area and the uncover area. As shown in FIG. 6, the images of the interpolated frame IMG_I may be predicted and generated based on the previous frame IMG_P and the current frame IMG_C. These image frames may include a background image moving downwards which is covered by a foreground object moving upwards. The interpolated frame IMG_I includes two blocks B3 and B4, which may be in the occlusion area defined by the VP circuit 204. It can be observed from FIG. 6 that the block B3 is in the cover area where the upward moving object covers an original background area, and that the block B4 is in the uncover area which is originally covered by the foreground object in the previous frame IMG_P but appears in the interpolated frame IMG_I.

In order to perform the determination of the cover and uncover areas, the correction MV of the block B3 is projected to the previous frame IMG_P and the current frame IMG_C. Note that the correction MV may be selected from a background MV that has a downward motion. The VP circuit 204 may obtain a pixel P3_P in the previous frame IMG_P and a pixel P3_C in the current frame IMG_C projected by this correction MV. By referring to the corresponding segmentation maps MAP_P and MAP_C, the VP circuit 204 may find that the segmentation flag of the pixel P3_P indicates a background image and the segmentation flag of the pixel P3_C indicates a foreground image. In such a situation, the VP circuit 204 may determine that the block B3 is in the cover area.

In a similar manner, the correction MV of the block B4 is projected to the previous frame IMG_P to obtain a pixel P4_P and projected to the current frame IMG_C to obtain a pixel P4_C. By referring to the segmentation maps MAP_P and MAP_C, the VP circuit 204 may find that the segmentation flag of the pixel P4_P indicates a foreground image and the segmentation flag of the pixel P4_C indicates a background image. In such a situation, the VP circuit 204 may determine that the block B4 is in the uncover area.

In an embodiment, the VP circuit 204 may determine that the pixel of the previous frame IMG_P and the pixel of the current frame IMG_C projected by the correction MV are both in the background area or both in the foreground area by referring to the segmentation maps MAP_P and MAP_C. In such a situation, the correction of MV may be omitted, in order to avoid unwanted side effects.

Note that in the above embodiment, the correction MV is projected to find the segmentation flag of a pixel in the previous frame IMG_P and the segmentation flag of a pixel in the current frame IMG_C to determine the cover and uncover areas. In another embodiment, the determination of cover/uncover may be performed by projecting the correction MV to an area having multiple pixels, and the segmentation flags of these pixels may be commonly considered. For example, if the area in the previous frame IMG_P projected by the correction MV has more background pixels and the area in the current frame IMG_C projected by the correction MV has more foreground pixels, the block of the correction MV may be determined to be in the cover area. In other words, each of P3_P, P3_C, P4_P and P4_C shown in FIG. 6 may be considered as an area or even a block, in which the segmentation flags of multiple pixels are applied to perform the cover/uncover determination.

As a result, the VP circuit 204 may output the information of cover and uncover areas of each block in the occlusion area to the MC circuit 206. In addition, as for each block in the occlusion area, the VP circuit 204 may output the correction MV to the MC circuit 206. Note that the VP circuit 204 may also output an original MV to the MC circuit 206 in addition to the correction MV. In an embodiment, the best bidirectional MV for each block determined by the ME circuit 202 may be taken as the original MV, to be provided for the VP circuit 204 and output to the MC circuit 206. As mentioned above, the correction MV is selected from a background MV, and the original MV may usually be a foreground MV. The MC circuit 206 is requested to take the accurate final MV from the correction MV and the original MV for the areas at the boundary between a background image and a foreground object.

Due to the limitation of hardware costs, the conventional MEMC process deals with image interpolation by taking one block as a unit. In other words, the ME and VP operations generate the best MV for a block, and in the MC operation, all pixels in this block should take the same best MV for generating the image content. The images generated in this manner may be blocky; hence, a deblocking algorithm may be applied to smooth the image to generate the final interpolated frame. As for a block at the boundary containing both foreground and background images, there may be at least partial pixels taking a wrong MV for interpolation. More specifically, if the final MV is a background MV, several pixels that should display the foreground may generate wrong images and thus the foreground boundary may be broken; or if the final MV is a foreground MV, several pixels that should display the background may generate wrong images and the foreground boundary may grow abnormally. After the deblocking algorithm is applied, the generated images at the boundary area may be blurred, which may result in the halo phenomenon.

In order to solve this problem, in the present invention, the MC circuit 206 performs compensation by referring to the segmentation map, which has pixel-based segmentation flags where each flag indicates the foreground or background state of a pixel. The pixel-level data may allow the MC circuit 206 to perform pixel-level compensation by dealing with the foreground pixels and the background pixels in the same block differently. In other words, the foreground pixels and the background pixels in the same block may take different MVs for interpolation, so as to achieve a clear and accurate interpolated image at the boundary area.

Figure 7:
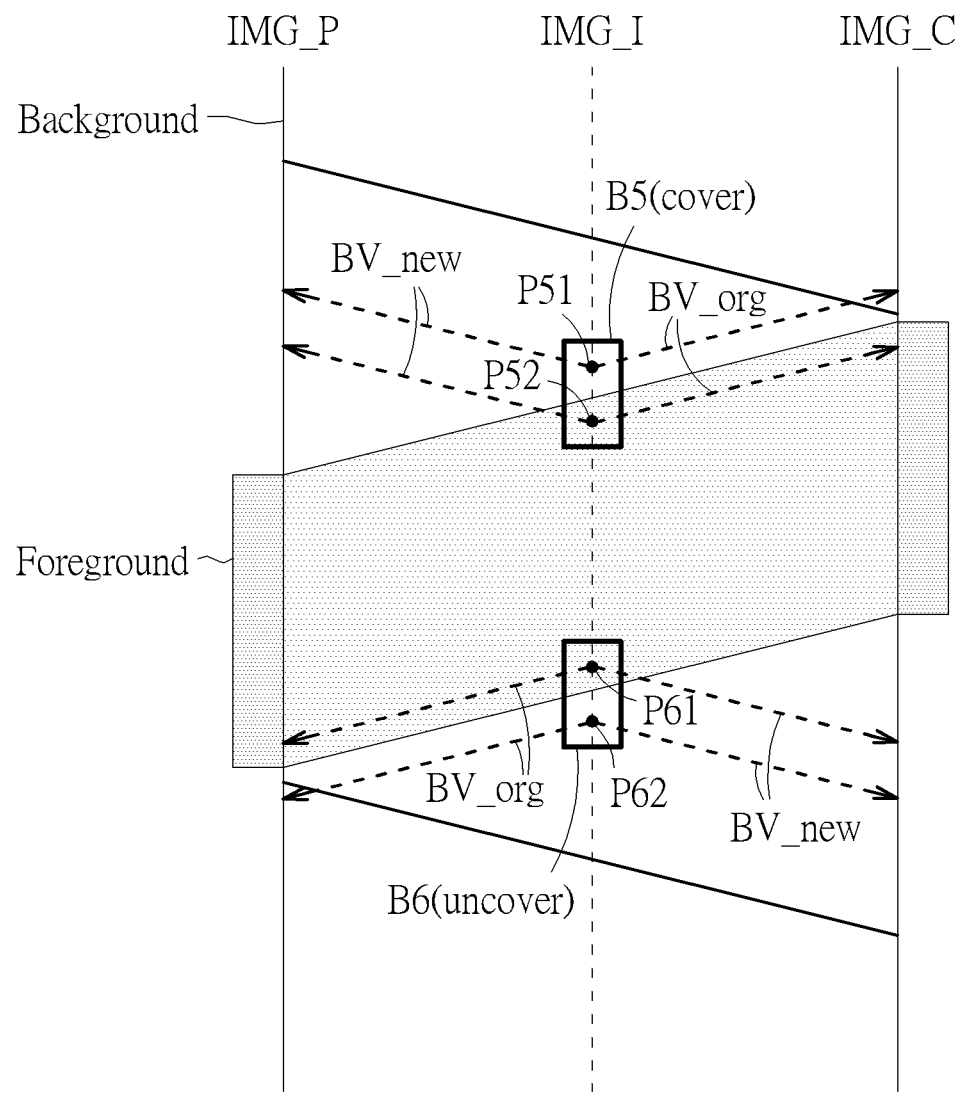
FIG. 7 illustrates the MC operation performed on blocks labeled as the segmentation boundary and determined to be in the occlusion area.

FIG. 7 illustrates the MC operation performed on blocks B5 and B6 labeled as the segmentation boundary and determined to be in the occlusion area. Similarly, in FIG. 7, the images of the interpolated frame IMG_I may be predicted and generated based on the previous frame IMG_P and the current frame IMG_C, and these image frames may include a background image moving downwards which is covered by a foreground object moving upwards. The blocks B5 and B6 of the interpolated frame IMG_I are taken as examples for performing the MC operation. In this embodiment, the block B5 is in the cover area and the block B6 is in the uncover area, which may be determined by the VP circuit 204 according to the projection of the correction MV and the segmentation map as described above.

The block B5 may include two pixels P51 and P52, where the pixel P51 is preferably predicted by using a background MV, and the pixel P52 is preferably predicted by using a foreground MV. The MV BV_org refers to the original MV, which may be the best bidirectional MV determined by the ME circuit 202. The MV BV_new refers to the correction MV, which may be the best bidirectional MV selected from neighboring blocks by the VP circuit 204. In the MC operation, each pixel may take its image from the previous frame IMG_P or the current frame IMG_C based on the segmentation map.

In this embodiment, the original MV BV_org may be applied to determine how to predict the pixel image. As for a specific pixel in a block determined to be in the cover area, the MC circuit 206 may project the original MV BV_org to the current frame IMG_C, to determine whether a pixel of the current frame IMG_C projected by the original MV BV_org has a foreground image or a background image, which may be indicated by the segmentation flag corresponding to the projected pixel in the segmentation map MAP_C of the current frame IMG_C. If the segmentation flag indicates that the projected pixel has the foreground image, the MC circuit 206 may select the original MV BV_org as the final MV to generate the image of the specific pixel. If the segmentation flag indicates that the projected pixel has the background image, the MC circuit 206 may select the correction MV BV_new as the final MV to generate the image of the specific pixel.

In the embodiment as shown in FIG. 7, the block B5 is determined to be in the cover area. The pixel P51 in the block B5 has the original MV BV_org which is projected to a pixel of the current frame IMG_C labeled as the background pixel by the corresponding segmentation flag; hence, the pixel P51 is determined to select the correction MV BV_new as the final MV, where the correction MV BV_new is a background MV which may be a bidirectional MV selected from a background block neighboring to the block B5. The pixel P52 in the block B5 has the original MV BV_org which is projected to a pixel of the current frame IMG_C labeled as the foreground pixel by the corresponding segmentation flag; hence, the pixel P52 is determined to select the original MV BV_org as the final MV, where the original MV BV_org is a foreground MV which may be the best bidirectional MV of the block B5 as determined by the ME circuit 202.

The approach for blocks in the uncover area may be performed differently. As for a specific pixel in a block determined to be in the uncover area, the MC circuit 206 may project the original MV BV_org to the previous frame IMG_P, to determine whether a pixel of the previous frame IMG_P projected by the original MV BV_org has a foreground image or a background image, which may be indicated by the segmentation flag corresponding to the projected pixel in the segmentation map MAP_P of the previous frame IMG_P. If the segmentation flag indicates that the projected pixel has the foreground image, the MC circuit 206 may select the original MV BV_org as the final MV to generate the image of the specific pixel. If the segmentation flag indicates that the projected pixel has the background image, the MC circuit 206 may select the correction MV BV_new as the final MV to generate the image of the specific pixel.

In the embodiment as shown in FIG. 7, the block B6 is determined to be in the uncover area. The pixel P61 in the block B6 has the original MV BV_org which is projected to a pixel of the previous frame IMG_P labeled as the foreground pixel by the corresponding segmentation flag; hence, the pixel P61 is determined to select the original MV BV_org as the final MV, where the original MV BV_org is a foreground MV which may be the best bidirectional MV of the block B6 as determined by the ME circuit 202. The pixel P62 in the block B6 has the original MV BV_org which is projected to a pixel of the previous frame IMG_P labeled as the background pixel by the corresponding segmentation flag; hence, the pixel P62 is determined to select the correction MV BV_new as the final MV, where the correction MV BV_new is a background MV which may be a bidirectional MV selected from a background block neighboring to the block B6.

Therefore, in a block at the boundary of a foreground object in the interpolated frame, a pixel determined to be background may take the correction MV to predict its image, and a pixel determined to be foreground may take the original MV to predict its image. The foreground and background pixels may be determined by projecting the original MV to the previous or current frame and referring to the corresponding segmentation map, according to whether the block is in the cover or uncover area. As a result, each pixel in the block may take the accurate MV for interpolation, so as to generate accurate and clear images and remove the halos in the occlusion area.

Note that the present invention aims at providing an image processing method for dehalo based on the segmentation map. Those skilled in the art may make modifications and alterations accordingly. For example, in the present invention, MEMC is performed based on the segmentation map, which may be any appropriate information bitmap generated by a detection module by using artificial intelligence (AI) or any other algorithm. The detection module may be a human detector, face detector, or a detector capable of detecting any possible foreground objects. As long as the detection module can detect the content of a picture and correspondingly generate pixel-level information according to the detection result, it should be applicable to the image processing method of the present invention.

As mentioned above, the conventional MEMC process deals with image interpolation by taking one block as a unit to generate one best MV for each block; hence, the blocks at the boundary of moving foreground objects where multiple different images are included may be blurred, and halo may easily appear at these boundary regions. In contrast, the MEMC provided in the present invention may perform motion compensation at pixel level based on the segmentation map. The segmentation map includes multiple segmentation flags, where each segmentation flag indicates the foreground or background state of one pixel. Therefore, in a block of the interpolated frame, each foreground pixel may take the accurate foreground MV and each background pixel may take the accurate background MV to perform interpolation. The halo may not appear in the interpolated frame since all the pixels can obtain their accurate final MV.

To sum up, the present invention provides a novel image processing method and related video processor, to remove the halo and improve the accuracy of MV prediction. The MEMC may be performed based on the segmentation map, which includes pixel-level data indicating the foreground and background information of each pixel. The video processor may include an ME circuit, a VP circuit and an MC circuit, each of which receives the segmentation map and performs respective operations based on the segmentation map to generate the interpolated image.

The ME circuit generates a best bidirectional MV for each block and determines whether to label each block as a segmentation boundary according to the segmentation flags in corresponding areas. The VP circuit generates a correction MV for each block when the block is labeled as the segmentation boundary, where the correction MV is selected from a best bidirectional MV of a neighboring block. The VP circuit further determines whether each block is in a cover area or an uncover area according to the correction MV. The obtained correction MV is provided for the MC circuit, and the best bidirectional MV determined by the ME circuit is taken as an original MV to be provided for the MC circuit. The MC circuit selects a final MV for each pixel of the block from the original MV and the correction MV according to the segmentation flag of the segmentation map corresponding to the pixel, where the MC circuit refers to the current frame or the previous frame to obtain the corresponding segmentation flag according to whether the pixel is in a block belonging to the cover area or the uncover area. The MEMC operations based on the segmentation map allow each pixel to perform image prediction by using an accurate MV, thereby removing the halo in the interpolated image.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing method for a video processor, for generating an interpolated frame having a plurality of blocks according to a previous frame and a current frame, the method comprising:
   receiving a segmentation map comprising a plurality of segmentation flags;
   generating an original motion vector (MV) for a first block among the plurality of blocks;
   determining whether to label the first block as a segmentation boundary according to the plurality of segmentation flags in an area corresponding to the first block;
   generating a correction MV for the first block when the first block is labeled as the segmentation boundary;
   determining whether the first block is in a cover area or an uncover area according to the correction MV; and
   selecting a final MV for a specific pixel of the first block from the original MV and the correction MV according to the segmentation map and according to whether the first block is determined to be in the cover area or the uncover area.

2. The image processing method of claim 1, wherein each of the plurality of segmentation flags indicates whether a pixel of the previous frame or the current frame has a foreground image or a background image.

3. The image processing method of claim 1, wherein the area corresponding to the first block comprises a first area in the previous frame projected by the original MV for the first block and a second area in the current frame projected by the original MV for the first block.

4. The image processing method of claim 3, wherein the step of determining whether to label the first block as the segmentation boundary according to the plurality of segmentation flags in the area corresponding to the first block comprises:
   calculating the number of pixels in the first area and the second area labeled as a foreground image by the segmentation map; and
   determining to label the first block as the segmentation boundary when the number of pixels labeled as the foreground image is between a first threshold and a second threshold.

5. The image processing method of claim 4, further comprising:
   determining that the first block is a background block when the number of pixels in the first area and the second area labeled as the foreground image is less than the first threshold.

6. The image processing method of claim 1, wherein the step of generating the correction MV for the first block comprises:
   selecting the correction MV for the first block from a plurality of candidate MVs for a plurality of neighboring blocks around the first block.

7. The image processing method of claim 6, wherein the correction MV is selected from one of the plurality of candidate MVs which is for one of the plurality of neighboring blocks determined to be a background block according to the segmentation map.

8. The image processing method of claim 6, wherein the correction MV is selected according to a cost function associated with at least one of: the distance between the first block and each of the plurality of neighboring blocks, and a sum of absolute difference (SAD) of each of the plurality of candidate MVs.

9. The image processing method of claim 1, wherein the step of determining whether the first block is in the cover area or the uncover area according to the correction MV comprises:
   determining that the first block is in the cover area when a first pixel of the current frame projected by the correction MV is indicated by a first segmentation flag among the plurality of segmentation flags that the first pixel has a foreground image and a second pixel of the previous frame projected by the correction MV is indicated by a second segmentation flag among the plurality of segmentation flags that the second pixel has a background image.

10. The image processing method of claim 1, wherein the step of determining whether the first block is in the cover area or the uncover area according to the correction MV comprises:
   determining that the first block is in the uncover area when a first pixel of the current frame projected by the correction MV is indicated by a first segmentation flag among the plurality of segmentation flags that the first pixel has a background image and a second pixel of the previous frame projected by the correction MV is indicated by a second segmentation flag among the plurality of segmentation flags that the second pixel has a foreground image.

11. The image processing method of claim 1, wherein the first block is determined to be in the cover area, and the step of selecting the final MV for the specific pixel of the first block from the original MV and the correction MV comprises:
   determining whether a third pixel of the current frame projected by the original MV has a foreground image or a background image as indicated by a third segmentation flag among the plurality of segmentation flags corresponding to the third pixel; and
   selecting the original MV as the final MV when the third segmentation flag indicates that the third pixel has the foreground image, or selecting the correction MV as the final MV when the third segmentation flag indicates that the third pixel has the background image.

12. The image processing method of claim 1, wherein the first block is determined to be in the uncover area, and the step of selecting the final MV for the specific pixel of the first block from the original MV and the correction MV comprises:

determining whether a fourth pixel of the previous frame projected by the original MV has a foreground image or a background image as indicated by a fourth segmentation flag among the plurality of segmentation flags corresponding to the fourth pixel; and selecting the original MV as the final MV when the fourth segmentation flag indicates that the fourth pixel has the foreground image, or selecting the correction MV as the final MV when the fourth segmentation flag indicates that the fourth pixel has the background image.

13. A video processor to generate an interpolated frame having a plurality of blocks according to a previous frame and a current frame by receiving a segmentation map comprising a plurality of segmentation flags, the video processor comprising:

a motion estimation (ME) circuit to generate an original motion vector (MV) for a first block among the plurality of blocks, and determine whether to label the first block as a segmentation boundary according to the plurality of segmentation flags in an area corresponding to the first block;

a vector process (VP) circuit, coupled to the ME circuit, to generate a correction MV for the first block when the ME circuit labels the first block as the segmentation boundary, and determine whether the first block is in a cover area or an uncover area according to the correction MV; and a motion compensation (MC) circuit, coupled to the VP circuit, to select a final MV for a specific pixel of the first block from the original MV and the correction MV according to the segmentation map and according to whether the first block is determined to be in the cover area or the uncover area by the VP circuit.

14. The video processor of claim 13, wherein each of the plurality of segmentation flags indicates whether a pixel of the previous frame or the current frame has a foreground image or a background image.

15. The video processor of claim 13, wherein the area corresponding to the first block comprises a first area in the previous frame projected by the original MV for the first block and a second area in the current frame projected by the original MV for the first block.

16. The video processor of claim 15, wherein the ME circuit calculates the number of pixels in the first area and the second area labeled as a foreground image by the segmentation map, and determines to label the first block as the segmentation boundary when the number of pixels labeled as the foreground image is between a first threshold and a second threshold.

17. The video processor of claim 16, wherein the ME circuit further determines that the first block is a background block when the number of pixels in the first area and the second area labeled as the foreground image is less than the first threshold.

18. The video processor of claim 13, wherein the VP circuit selects the correction MV for the first block from a plurality of candidate MVs for a plurality of neighboring blocks around the first block.

19. The video processor of claim 18, wherein the correction MV is selected from one of the plurality of candidate MVs which is for one of the plurality of neighboring blocks determined to be a background block according to the segmentation map.

20. The video processor of claim 18, wherein the correction MV is selected according to a cost function associated with at least one of: the distance between the first block and each of the plurality of neighboring blocks, and a sum of absolute difference (SAD) of each of the plurality of candidate MVs.

21. The video processor of claim 13, wherein the VP circuit determines that the first block is in the cover area when a first pixel of the current frame projected by the correction MV is indicated by a first segmentation flag among the plurality of segmentation flags that the first pixel has a foreground image and a second pixel of the previous frame projected by the correction MV is indicated by a second segmentation flag among the plurality of segmentation flags that the second pixel has a background image.

22. The video processor of claim 13, wherein the VP circuit determines that the first block is in the uncover area when a first pixel of the current frame projected by the correction MV is indicated by a first segmentation flag among the plurality of segmentation flags that the first pixel has a background image and a second pixel of the previous frame projected by the correction MV is indicated by a second segmentation flag among the plurality of segmentation flags that the second pixel has a foreground image.

23. The video processor of claim 13, wherein the VP circuit determines that the first block is in the cover area, and the MC circuit determines whether a third pixel of the current frame projected by the original MV has a foreground image or a background image as indicated by a third segmentation flag among the plurality of segmentation flags corresponding to the third pixel, and selects the original MV as the final MV when the third segmentation flag indicates that the third pixel has the foreground image or selects the correction MV as the final MV when the third segmentation flag indicates that the third pixel has the background image.

24. The video processor of claim 13, wherein the VP circuit determines that the first block is in the uncover area, and the MC circuit determines whether a fourth pixel of the previous frame projected by the original MV has a foreground image or a background image as indicated by a fourth segmentation flag among the plurality of segmentation flags corresponding to the fourth pixel, and selects the original MV as the final MV when the fourth segmentation flag indicates that the fourth pixel has the foreground image or selects the correction MV as the final MV when the fourth segmentation flag indicates that the fourth pixel has the background image.

25. A video processor to generate an interpolated frame having a plurality of blocks according to a previous frame and a current frame by receiving a segmentation map comprising a plurality of segmentation flags, the video processor comprising:

a motion estimation (ME) circuit to generate an original motion vector (MV) for a first block among the plurality of blocks, and determine whether to label the first block as a segmentation boundary according to the plurality of segmentation flags in an area corresponding to the first block;

a vector process (VP) circuit, coupled to the ME circuit, to generate a correction MV for the first block when the ME circuit labels the first block as the segmentation boundary; and a motion compensation (MC) circuit, coupled to the VP circuit, to select a final MV for a specific pixel of the first block from the original MV and the correction MV according to the segmentation map.

* * * * *